Dec. 13, 1938.  P. H. POWERS  2,139,849
CARRIER
Filed Feb. 23, 1938  2 Sheets-Sheet 1
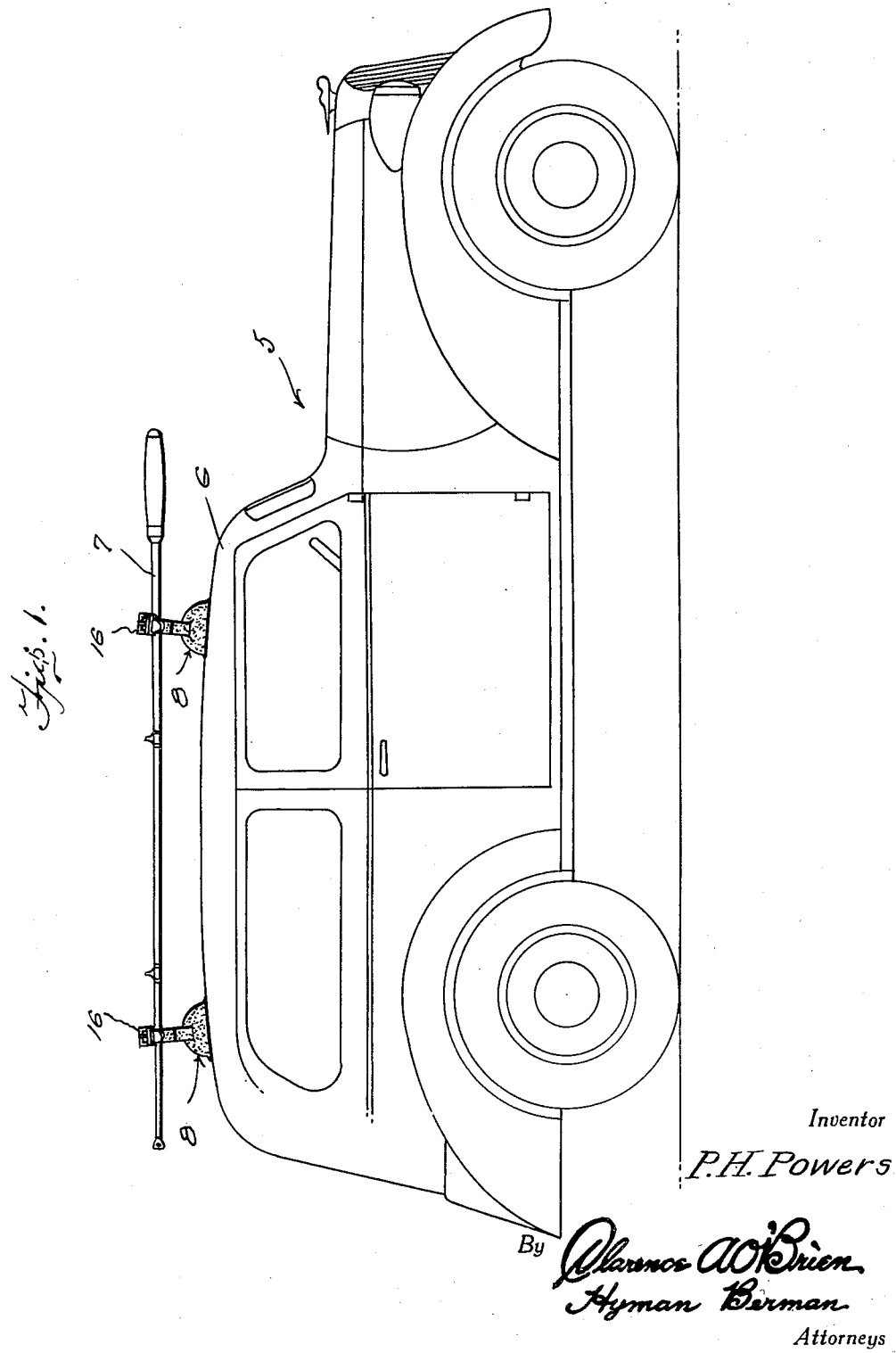
Inventor
P. H. Powers
By Clarence A. O'Brien
Hyman Berman
Attorneys

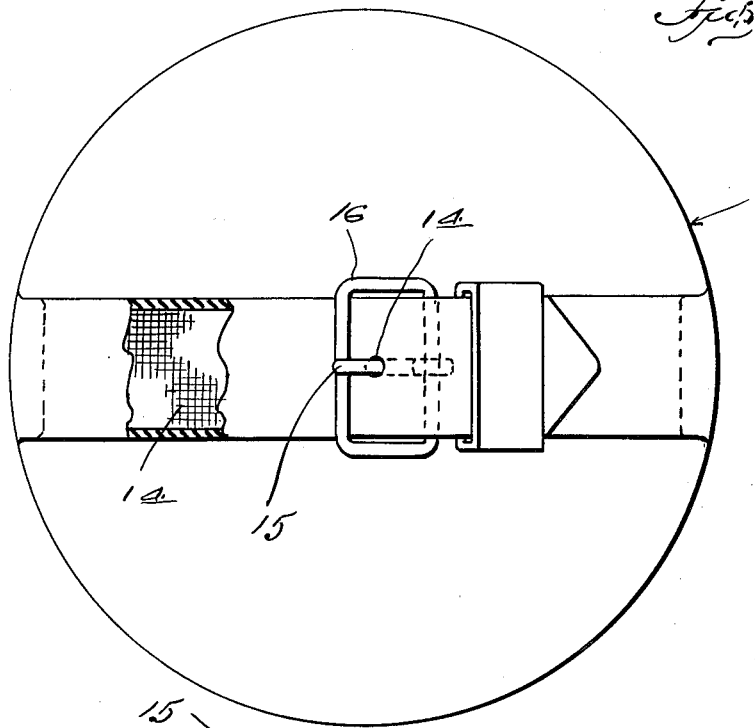
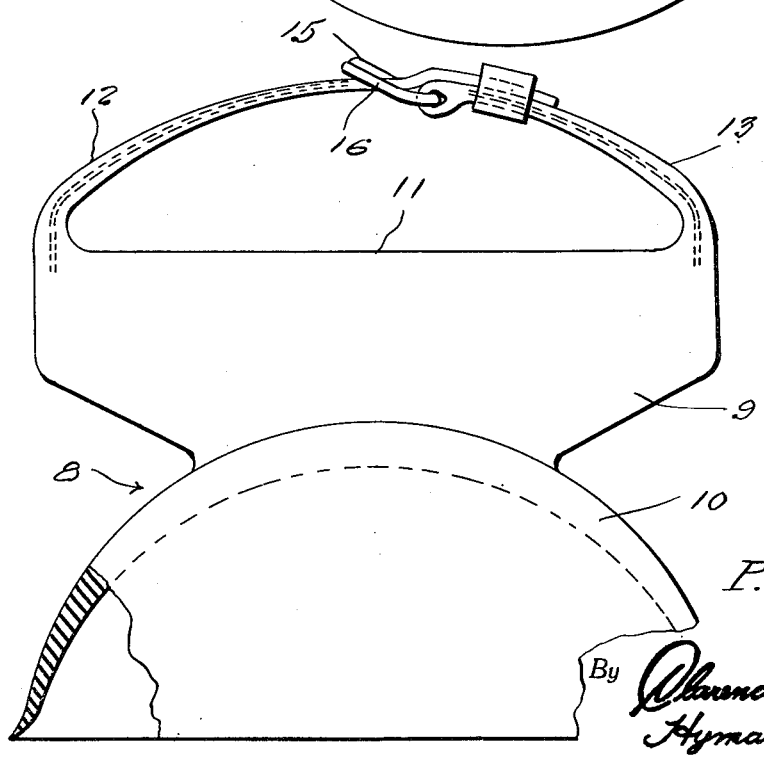

Patented Dec. 13, 1938

2,139,849

UNITED STATES PATENT OFFICE 2,139,849

CARRIER

Paul H. Powers, Chickasaw, Ala., assignor of one-half to Clarence C. Nall, Chickasaw, Ala.

Application February 23, 1938, Serial No. 192,131

2 Claims. (Cl. 248—206)

This invention appertains to new and useful improvements in carriers and more particularly to a carrier for automobiles especially adapted for carrying fishing poles and other elongated members on the top of the vehicle.

The principal object of the present invention is to provide a carrier which involves a pair of carrier elements of suction cup construction which can be readily adhered to the usual metal tops of closed type automobile in a quick and satisfactory manner.

Other important objects and advantages of the invention will become apparent to the reader of the following specification.

In the drawings:—

Figure 1 represents a side elevational view of an automobile equipped with the carrier.

Figure 2 is a top plan view of one of the carrier units with a portion thereof in section.

Figure 3 is a side elevational view of one of the carrier units with parts broken away.

Referring to the drawings wherein like numerals designate like parts, it can be seen in Figure 1, that numeral 5 generally refers to an automobile of the all metal top construction 6.

In employing the carrier for carrying fishing poles 7 and like elongated articles, a pair of like units generally referred to by numeral 8 are utilized.

Each of these units consists of a body 9 of rubber or other similar material, the lower portion of which is flared outwardly as at 10 to define a large suction cup construction. The top of the body 9 is provided with the flat surface 11 upon which fishing poles or the like can rest and rising from the opposite side portions thereof are the strap sections 12—13, each of which is reinforced by a strip 14 of fabric. The strap 12 is provided with openings 14 for receiving the prong 15 of the buckle 16 which is secured to the strap section 13.

Obviously, as many of these units as is desired can be employed and depending upon the size of the units, a considerable number of rods 7 or other elongated members can be accommodated.

While the foregoing specification sets forth the invention in specific terms, it is to be understood that numerous changes in the shape, size and materials may be resorted to without departing from the spirit and scope of the invention as claimed.

Having described the invention, what is claimed as new is:—

1. A carrier of the character stated comprising a body of resilient material, said body being constructed at its lower portion to form a vacuum cup, said body being formed at its upper portion to provide a flaring head construction, said head construction being formed to define elongated strap-like members, a reinforcing element embedded in each of the strap-like members, and connecting means between the end portions of the said strap-like members.

2. A carrier of the character stated comprising a body, said body being of resilient construction at its lower portion and formed to provide a vacuum cup, said body being constructed at its upper portion to provide a flaring article supporting head construction, said head construction being provided with elongated strap means and connecting means between the end portions of the said strap means.

PAUL H. POWERS.